(12) United States Patent
Hadley et al.

(10) Patent No.: US 7,156,605 B1
(45) Date of Patent: Jan. 2, 2007

(54) SUBSTRATE TRANSPORT AND MARKING ASSEMBLY

(75) Inventors: Darrell J. Hadley, Oklahoma City, OK (US); Jeffrey D. Hadley, Edmond, OK (US); Timothy B. Kirk, Oklahoma City, OK (US); Michael W. Butler, Oklahoma City, OK (US)

(73) Assignee: Hadley Design, Inc., Edmond, OK (US)

( * ) Notice: Subject to any disclaimer, the term of this patent is extended or adjusted under 35 U.S.C. 154(b) by 18 days.

(21) Appl. No.: 10/347,129

(22) Filed: Jan. 17, 2003

Related U.S. Application Data

(60) Provisional application No. 60/349,454, filed on Jan. 18, 2002.

(51) Int. Cl.
*B21B 39/14* (2006.01)
*B65G 25/00* (2006.01)
*B65G 47/24* (2006.01)

(52) U.S. Cl. .................. 414/782; 414/782; 414/746.4; 414/798.9; 198/409; 198/836.1; 271/150; 493/55

(58) Field of Classification Search ........ 271/149–153, 271/31; 414/798.9, 780, 782, 746.4; 198/409, 198/836.1
See application file for complete search history.

(56) References Cited

U.S. PATENT DOCUMENTS

| 2,361,907 | A | * | 11/1944 | Baker et al. ................. 271/31 |
| 3,598,399 | A | * | 8/1971 | Cottrell ....................... 271/146 |
| 4,273,322 | A | * | 6/1981 | Ginther et al. .............. 271/149 |
| 4,582,315 | A | | 4/1986 | Scarpa et al. |
| 4,644,427 | A | | 2/1987 | Ashby |
| 4,934,682 | A | * | 6/1990 | Rece et al. ................. 271/3.12 |
| 4,966,271 | A | * | 10/1990 | Jenkner ....................... 198/409 |
| 5,031,060 | A | | 7/1991 | Ashby |
| 5,050,023 | A | | 9/1991 | Ashby |
| 5,088,720 | A | | 2/1992 | Beeman et al. |
| 5,131,899 | A | * | 7/1992 | Nagahashi et al. ......... 493/317 |
| 5,178,263 | A | * | 1/1993 | Kempen .................. 198/836.1 |
| 5,211,529 | A | * | 5/1993 | Esala et al. .............. 414/795.8 |
| 5,588,643 | A | * | 12/1996 | Tagliaferri et al. ............ 271/35 |
| 5,611,436 | A | | 3/1997 | Ashby |
| 5,653,671 | A | | 8/1997 | Reuteler |

(Continued)

OTHER PUBLICATIONS

Coding, Marking, Labelling and Control for the Packaging Industry Travtec TR-1000 Casefeeder (Bulletin); pp. 1-2; Travtec Limited; Lancashire, UK.

(Continued)

*Primary Examiner*—Gene O. Crawford
*Assistant Examiner*—Greg Adams
(74) *Attorney, Agent, or Firm*—Fellers, Snider, et al.

(57) ABSTRACT

An apparatus for transporting and marking a substrate, such as a collapsed corrugated cardboard carton. A feeder station is configured to receive a substantially vertically aligned stack of substrates. An advancement assembly of the feeder station successively moves the lower portions of the substrates in an inboard direction and a tensioner assembly applies a clamping force to the upper portions of the substrates. A transfer assembly engages the innermost substrate in the stack to rotate and remove the substrate from the rest of the stack and provide the substrate to a transport and marking station, which drives the substrate past a marking mechanism. The transport and marking station advances the substrate into a gravity discharge station which induces sufficient tilt in the substrate so that, upon exiting of the substrate from the transport, gravity induces the substrate to rotate and fall in a controlled fashion into a completed stack.

14 Claims, 9 Drawing Sheets

U.S. PATENT DOCUMENTS

| | | |
|---|---|---|
| 5,662,577 A | 9/1997 | Reuteler |
| 5,732,623 A | 3/1998 | Compera et al. |
| 5,975,839 A | 11/1999 | Ashby |
| 6,003,662 A * | 12/1999 | McCaffrey et al. ...... 198/836.3 |
| 6,024,532 A | 2/2000 | Ashby |
| 6,113,345 A | 9/2000 | Ashby |
| 6,152,621 A | 11/2000 | Langan |
| 6,168,372 B1 * | 1/2001 | Greenwell .................. 414/801 |
| 6,290,453 B1 * | 9/2001 | Corniani et al. ......... 414/798.9 |
| 6,490,843 B1 | 12/2002 | May |

OTHER PUBLICATIONS

Coding, Marking, Labelling and Control for the Packaging Industry Travtec TR-1000 Technical Specification (Bulletin); pp. 1-2; Travtec Limited; Lancashire, UK.

* cited by examiner

SUBSTRATE TRANSPORT AND MARKING ASSEMBLY

RELATED APPLICATIONS

This application claims the benefit of U.S. Provisional Application No. 60/349,454 filed Jan. 18, 2002.

FIELD OF THE INVENTION

This invention relates generally to the field of material handling systems and more particularly, but not by way of limitation, to a system that transports and marks a stack of substrates such as collapsed corrugated cardboard cartons.

BACKGROUND

It is often desirable to mark a number of stackable, planar substrates in an automated fashion. For example, commercial entities often employ collapsible corrugated cardboard cartons to package and ship products. In such case it can be desirable to mark an external surface of the cartons with logos, shipping labels, barcodes, or other information prior to assembly and loading of the cartons.

While prior art substrate transport and marking methodologies have been found operable, there is a continued need for approaches that provide improved performance and throughput while reducing the need for user interaction. It is to such improvements that the present invention is directed.

SUMMARY OF THE INVENTION

In accordance with preferred embodiments, an apparatus is provided to transport and mark substrates such as collapsible, corrugated cardboard cartons.

The apparatus preferably includes a feeder station, a transport and marking station and a gravity discharge station. The feeder station is configured to receive a substantially vertically aligned stack of substrates from an attending user.

An advancement assembly of the feeder station successively moves the lower portions of the substrates in an inboard direction while a tensioner assembly applies a clamping force to the upper portions of the substrates. The stacked substrates are preferably oriented so as to lean forward at a slight angle in the inboard direction.

A transfer assembly engages the innermost substrate in the stack to rotate and remove the substrate from the rest of the stack. The transfer assembly then provides the substrate to a transport and marking station, which drives the substrate past a marking mechanism to apply the desired marking upon the substrate. Preferably, the marking mechanism comprises an inkjet printer.

The transport and marking station then advances the substrate into a gravity discharge station. The discharge station gradually induces a sufficient tilt in the substrate so that, upon exiting of the substrate from the transport, gravity induces the substrate to rotate and fall in a controlled fashion into a completed stack.

These and various other features and advantages which characterize the claimed invention will be apparent from a reading of the following detailed description and a review of the associated drawings.

DETAILED DESCRIPTION

Figure 1:
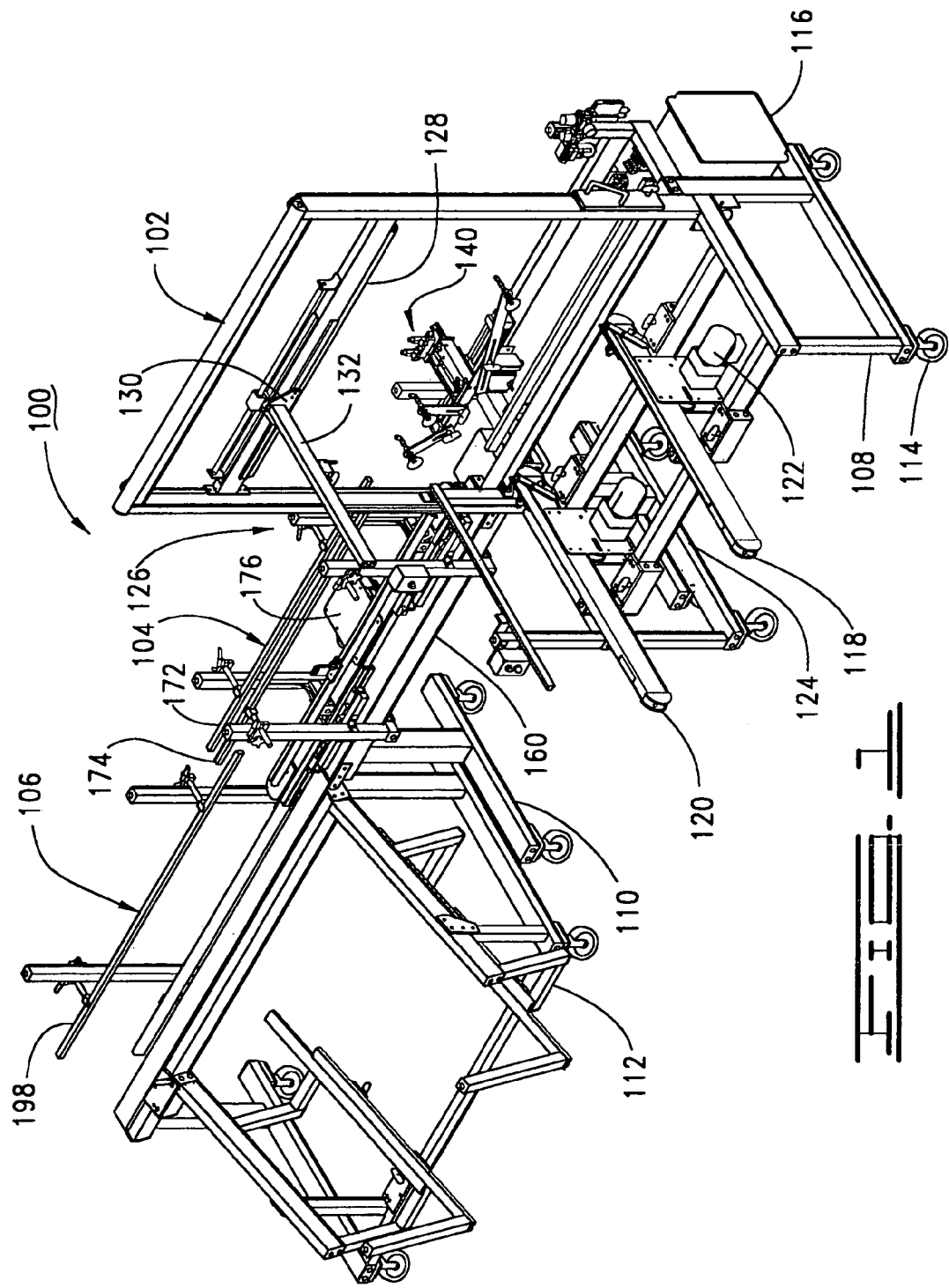
FIG. 1 provides an isometric view of a substrate transport and marking assembly constructed and operated in accordance with preferred embodiments of the present invention, the assembly comprising a feeder station, a transport and marking station and a gravity discharge station.

FIG. 1 provides an isometric view of a substrate transport and marking assembly 100 constructed and operated in accordance with preferred embodiments of the present invention. The assembly 100 preferably comprises a feeder station 102, a transport and marking station 104 and a gravity discharge station 106. The assembly 100 is preferably configured to handle a number of stacked, collapsible corrugated cardboard cartons, although other types of planar substrates can readily be processed as desired.

Figure 2:
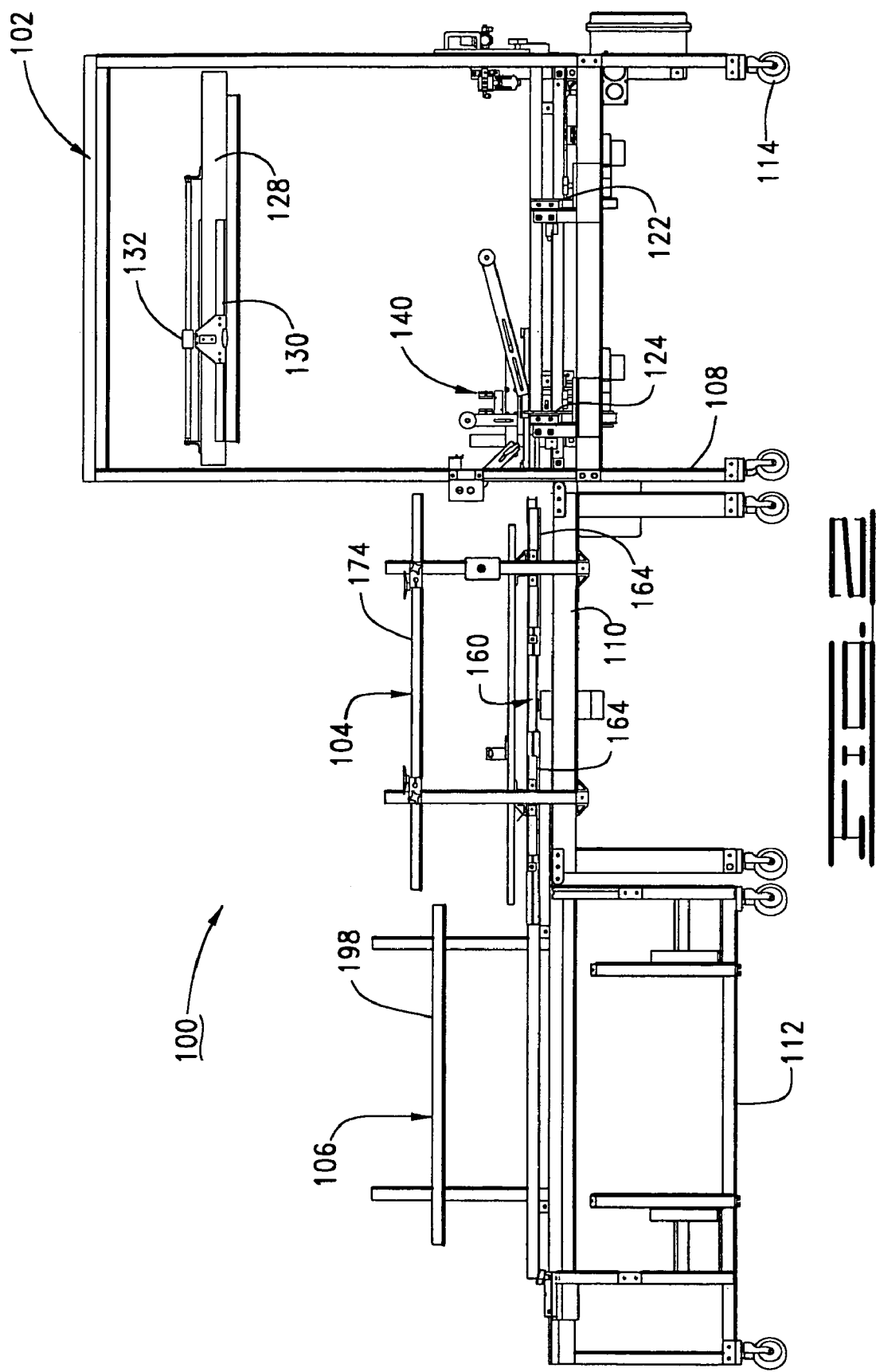
FIG. 2 provides a top plan view of the assembly of FIG. 1.
Figure 3:
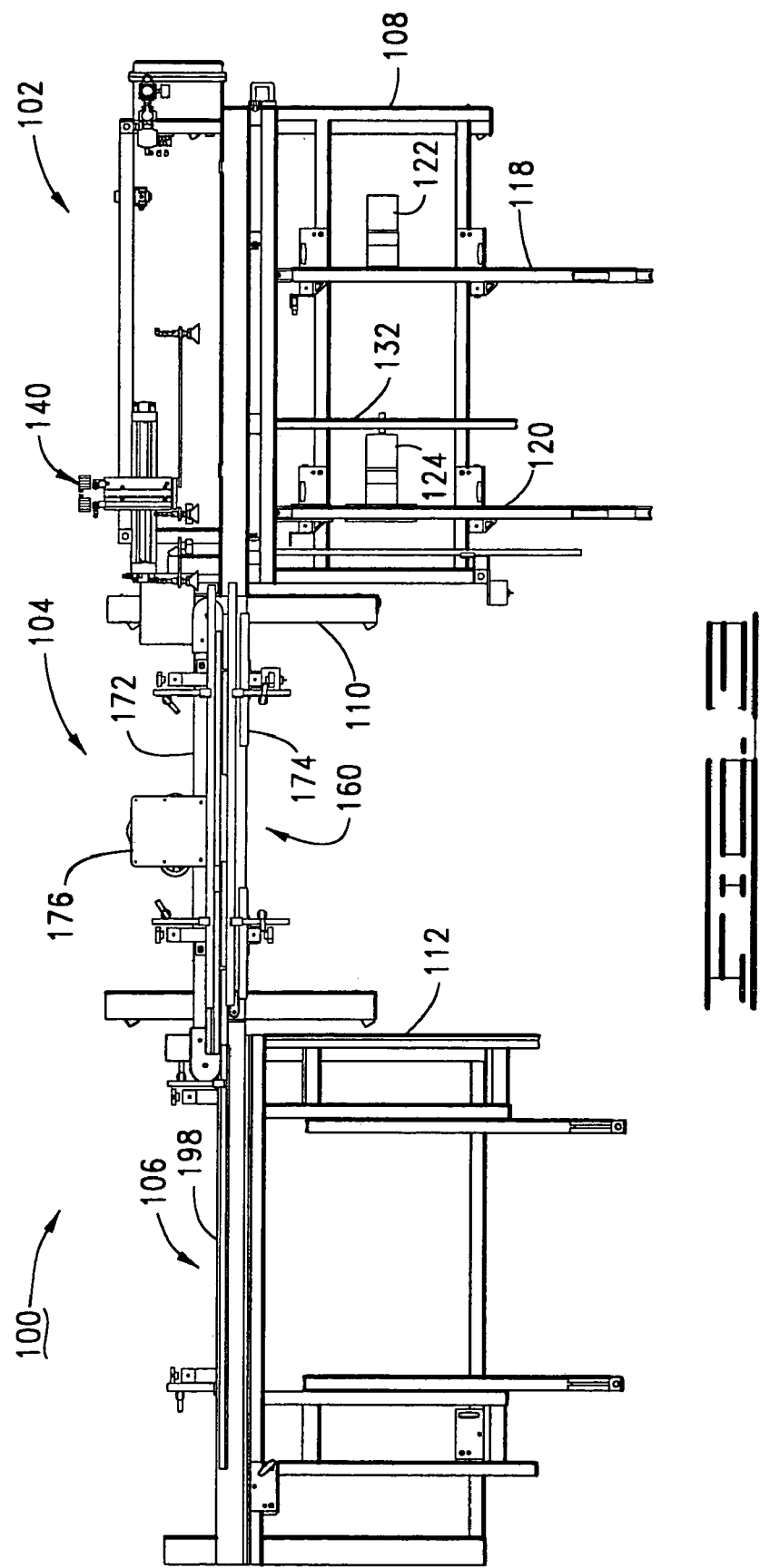
FIG. 3 provides a side elevational view of the assembly of FIG. 1.

Generally, the feeder station 102 (feeder) is configured to receive and hold a stack of the cartons and feed the cartons one at a time to the transport and marking station 104 (transport). The transport 104 performs a marking operation on the cartons to encode the desired information. Such marking can include a printing operation such as with an inkjet printhead, the application of a label or layer of adhesive, etc. The cartons are then automatically stacked by the discharge station 106 (stacker). FIG. 2 provides a side elevational view of the assembly 100 and FIG. 3 provides a top plan view of the assembly 100.

The various stations 102, 104 and 106 each include respective frames 108, 110 and 112 formed from a suitably rigid material, such as extruded aluminum beam members. Various portions of the frames 108, 110 and 112 are adjustable to accommodate a wide variety of different sizes, shapes and thicknesses of substrates. Thus, while the system 100 is configured to handle generally rectangularly shaped substrates, other, nonstandard shapes can be accommodated as well.

The stations are mounted on rollable, lockable castors 114 for ease of placement of the system. The stations are modular in that, for example, the feeder 102 and transport 104 can be used without the stacker 106, in which case the substrates are automatically fed but manually stacked by a user. Likewise, the transport 104 and stacker 106 can be used without the feeder 102, in which case the substrates are manually fed by a user but are automatically stacked. The stations are computer controlled using controller unit 116 and preferably, an associated personal computer (PC) with associated programming to provide a suitable graphical user interface.

The feeder 102 includes a pair of roller assemblies 118, 120 configured to support a stack of planar substrates. The roller assemblies 118, 120 are independently actuated by respective motor assemblies 122, 124 to advance and maintain a desired alignment of the substrates during operation.

Figure 4:
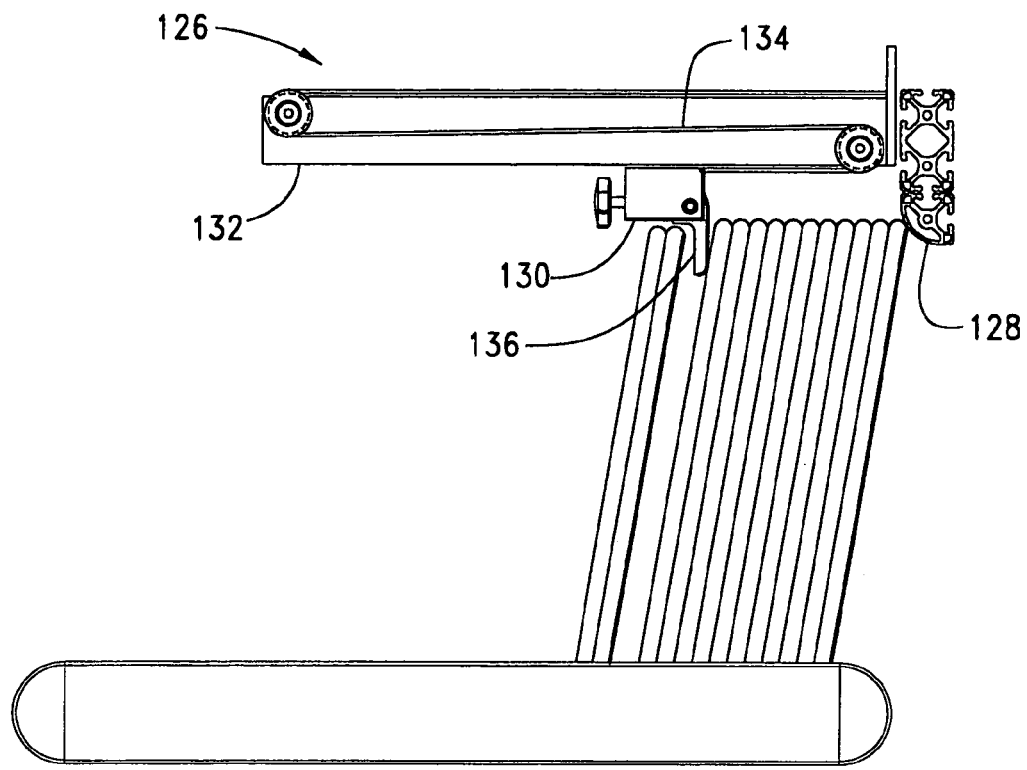
FIGS. 4 and 5 provide selected views of a tensioner assembly of the feeder station of FIGS. 1–3.
Figure 5:
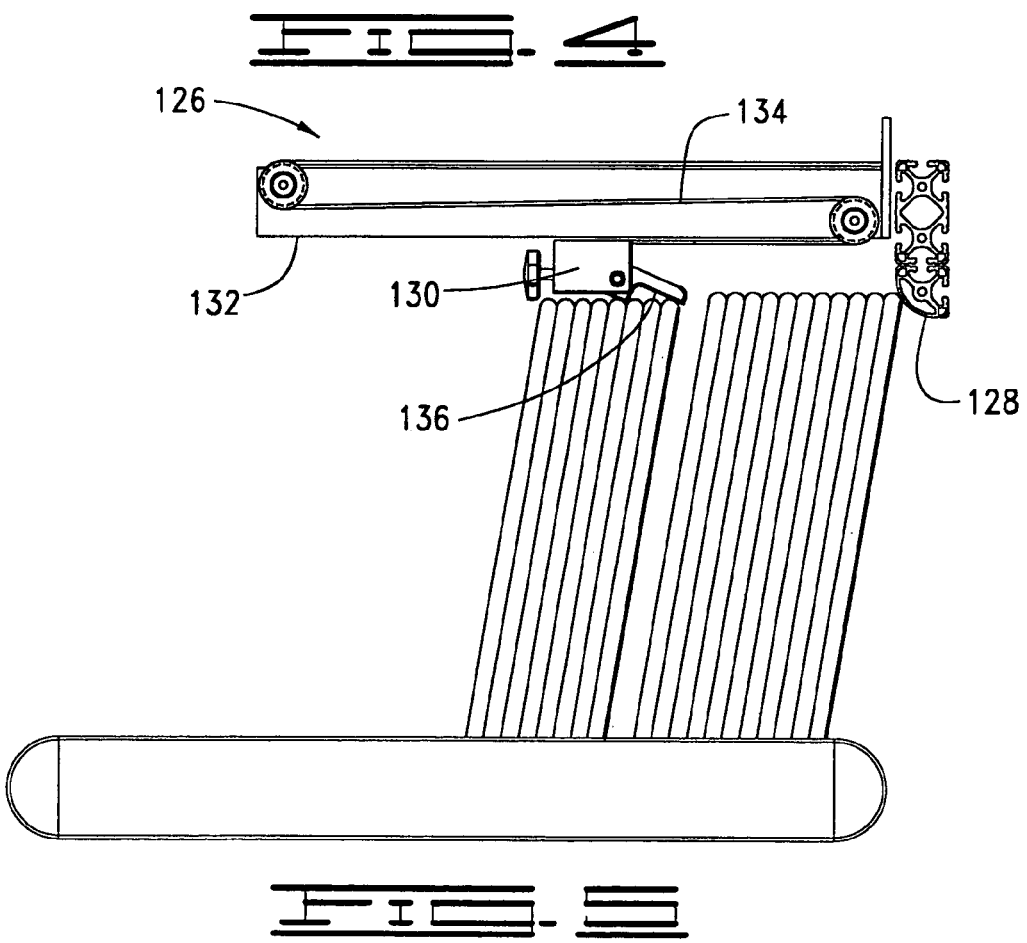

As further shown in FIGS. 4 and 5, the feeder includes a retention assembly 126 used to retain the stack. The retention assembly 126 includes a stationary retention bar 128 and a moveable retention bar 130 which slidingly moves along transverse support 132. An elastic retainer cord 134 (preferably made of "bungee-cord" type material) is routed along the support 132 as shown and attaches to the moveable retention bar 130.

The stack is placed by the user in a substantially upright, vertical orientation upon the roller assemblies 118, 120 and preferably leaned forward (inboard) at a slight angle (such as about 5 degrees from vertical) so that a top portion of the innermost substrate in the stack bears against the stationary retention bar 128. The moveable retention bar 130 is preferably hinged to allow retraction of a retention member 136 as the bar 130 is moved outboard beyond the stack. Once the retention member 136 clears the stack, it drops back to the normal orientation shown in FIGS. 1–3 and the cord 134 causes the retention member 136 to bear against the outermost substrate in the stack to apply a compressive force to the stack.

Because the substrates are preferably angled forward, a first stack of substrates is loaded and the moveable retention bar 130 is moved behind the stack to retain the stack. During feeding of the first stack, a second stack can be placed on the roller assemblies 118, 120 outboard of the first stack. The combined weight of the respective stacks will be sufficient to cause the stacks to remain in the desired orientation without the need to immediately pull the moveable retention bar 130 outside beyond the second stack. Rather, the user can continue to add stacks as desired and, at any time as the first stack nears completion, the retention bar 130 can be retracted and placed outboard of the then loaded substrates. This greatly simplifies the tasks of the user attending the loading of the substrates.

Figure 6:
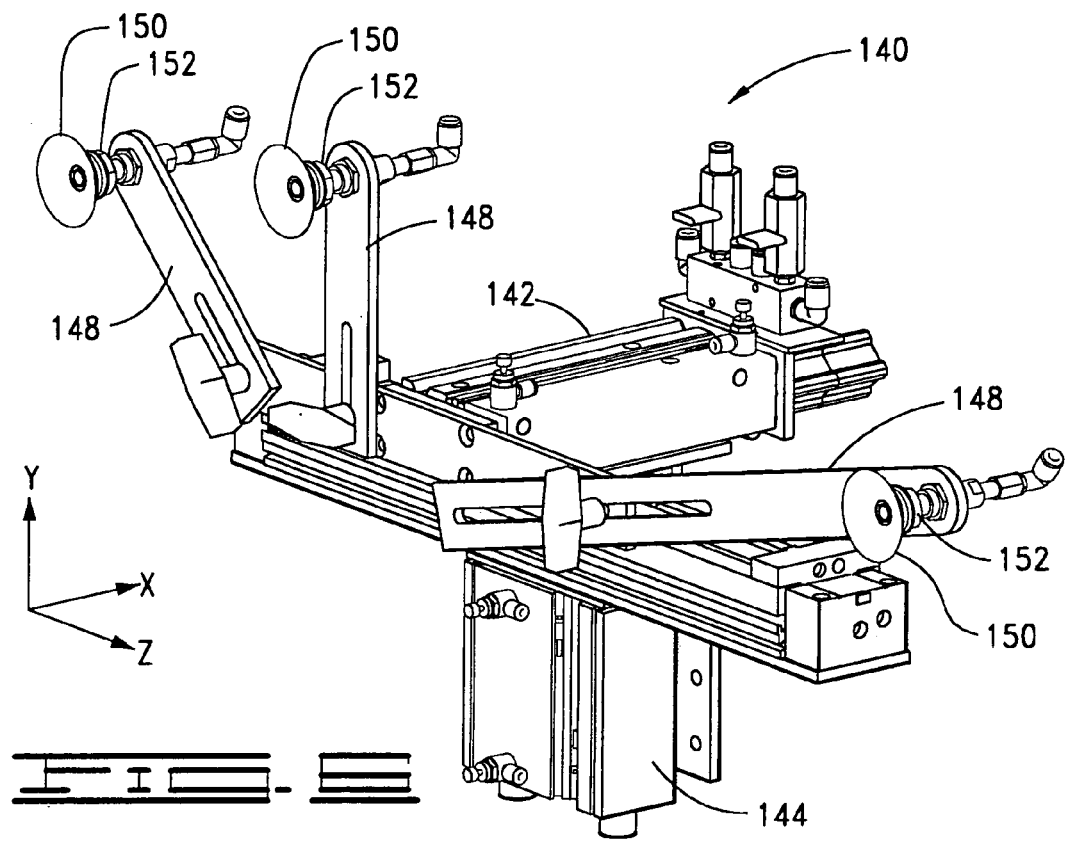
FIG. 6 illustrates a transfer assembly of the feeder station.

FIG. 6 illustrates a transfer assembly 140 of the feeder 102 used to load each substrate in turn into the transport 104. The transfer assembly 140 is configured for 3-axis movement in each of x (vertical), y (horizontal, inboard to outboard) and z (horizontal, longitudinal along the length of the system) axes. Respective x and y axis movements are controlled by actuators 142 and 144; z axis movement is carried out by movement of the transfer assembly 140 along transverse actuator 146 (best seen in top plan view of FIG. 3).

The transfer assembly 140 preferably includes three (3) support arms 148 each supporting a compliant vacuum attachment cup 150. Retractable piston dampers 152 allow respective movement of the cups 150 relative to the arms 148 while at the same time urging each cup back to a nominally centered position with respect to the arms.

Figure 7:
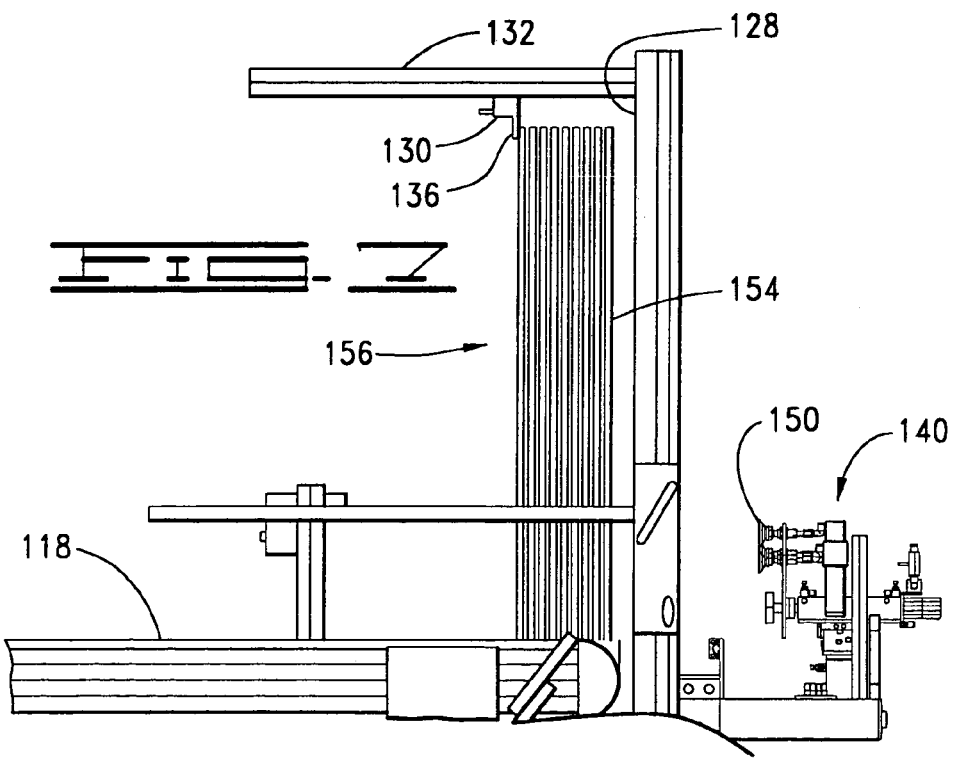
FIGS. 7–9 generally illustrate operation of the transfer assembly to successively feed substrates from an input stack.
Figure 8:
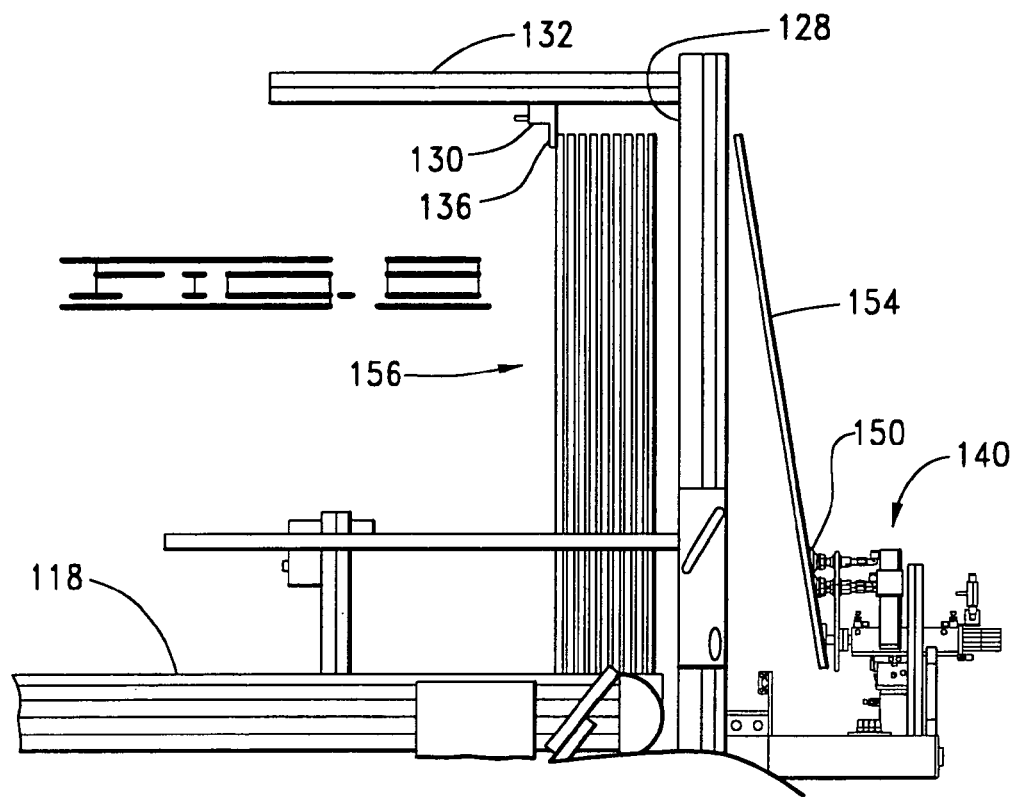
Figure 9:
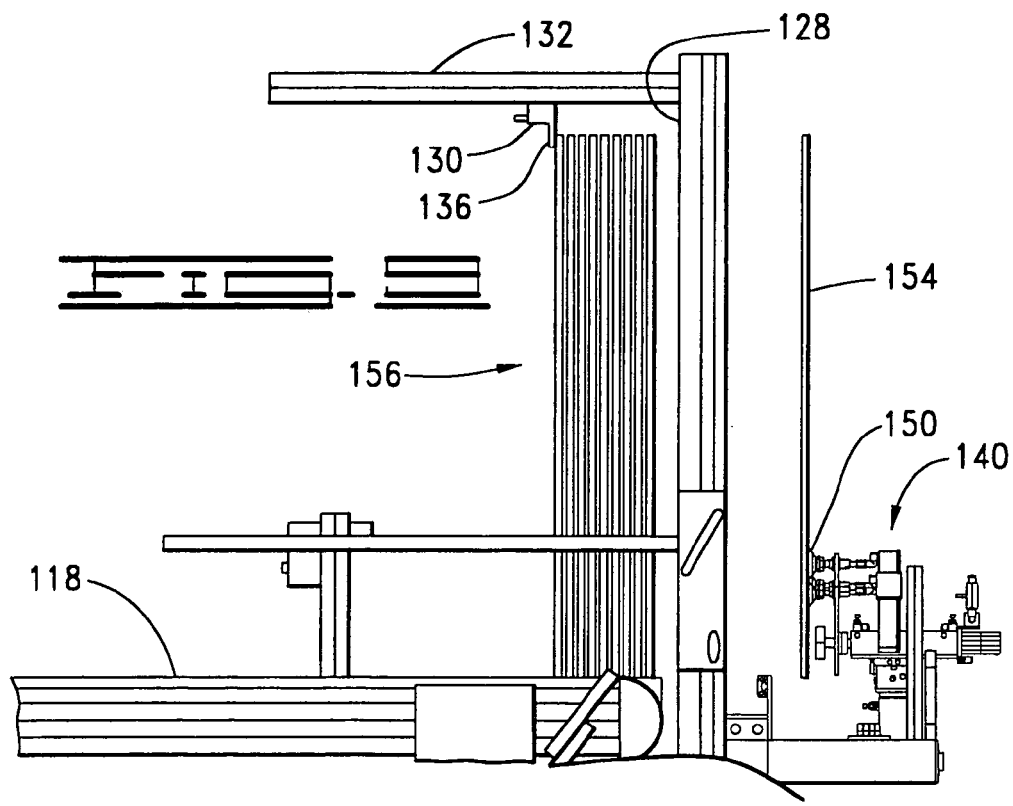

Preferred operation of the transfer assembly is generally illustrated by FIGS. 7–9. In FIG. 7, the transfer assembly 140 is aligned to engage the innermost substrate (numerically denoted at 154) in the stack (denoted at 156). The transfer assembly 140 moves forward in the outboard (x-axis) direction until the cups 150 mate and establish a suction connection with the substrate 154, after which the transfer assembly 140 retracts in the inboard (x-axis) direction to the position shown in FIG. 8. During this operation the top portion of the substrate 154 preferably remains clamped between the retention bars 128, 130 and the bottom portion of the substrate 154 is rotated outwardly (in the inboard direction).

The transfer assembly 140 next moves downwardly in the y-direction, thereby separating the substrate 154 away from the stack 156. As the substrate 154 releases from the bar 128, the dampers 152 operate to nominally orient the substrate 152 in a substantially vertical (y-axis) orientation as shown in FIG. 9. The transfer assembly 140 then advances the substrate 154 transversely in the z-axis to feed a leading edge into the transport 104.

Optical sensors (not separately designated) detect the placement of the leading edge of the substrate 154 into the transport 104, allowing the transport assembly 140 to release the substrate 154 once appropriate control over the substrate 154 has been established by the transport 104. The transport assembly 140 then moves back to the position shown in FIG. 7 to repeat the process with the next substrate in the stack. Preferably, a deck surface (not shown) is provided in the feeder station 102 to support a bottom edge of the substrate 154 as it is fed into the transport 104.

Figure 10:
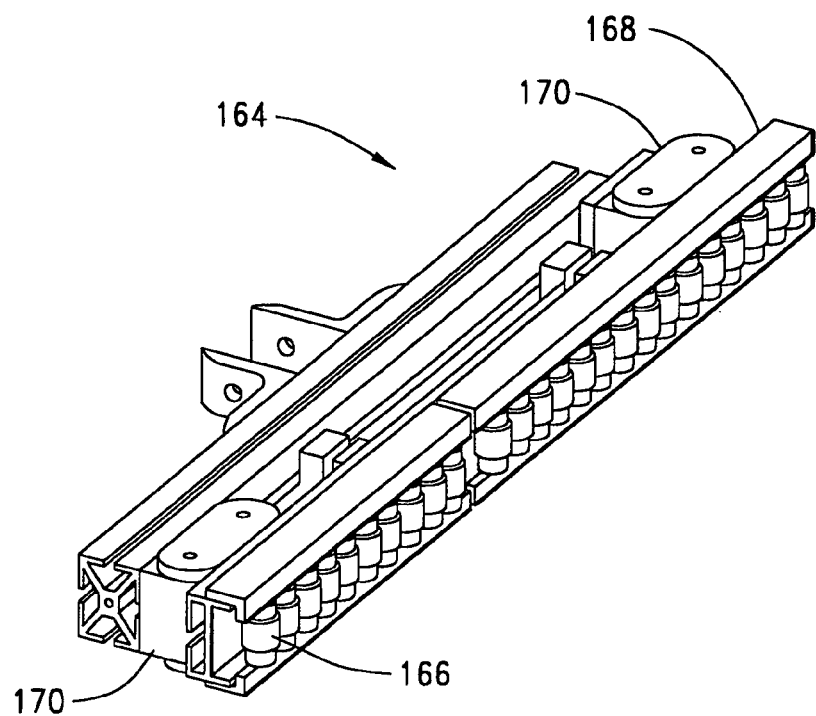
FIG. 10 illustrates a roller assembly of a drive system of the transport and marking station.
Figure 11:
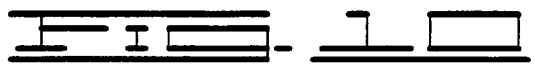
FIG. 11 provides a schematic representation of the roller assembly in conjunction with a drive belt of the drive system.

The transport 104 utilities a belt/roller drive system 160 to advance the substrate 154 along the length of the transport, preferably at a constant linear velocity. The system 160 utilizes a continuous drive belt 162 which faces one or more adjacent roller assemblies 164, as shown in FIG. 10. The roller assembly 164 includes a number of adjacent rollers 166 supported in a frame 168 which in turn is biased in a direction toward the substrate by spring assemblies 170, as represented in FIG. 11.

Figure 12:
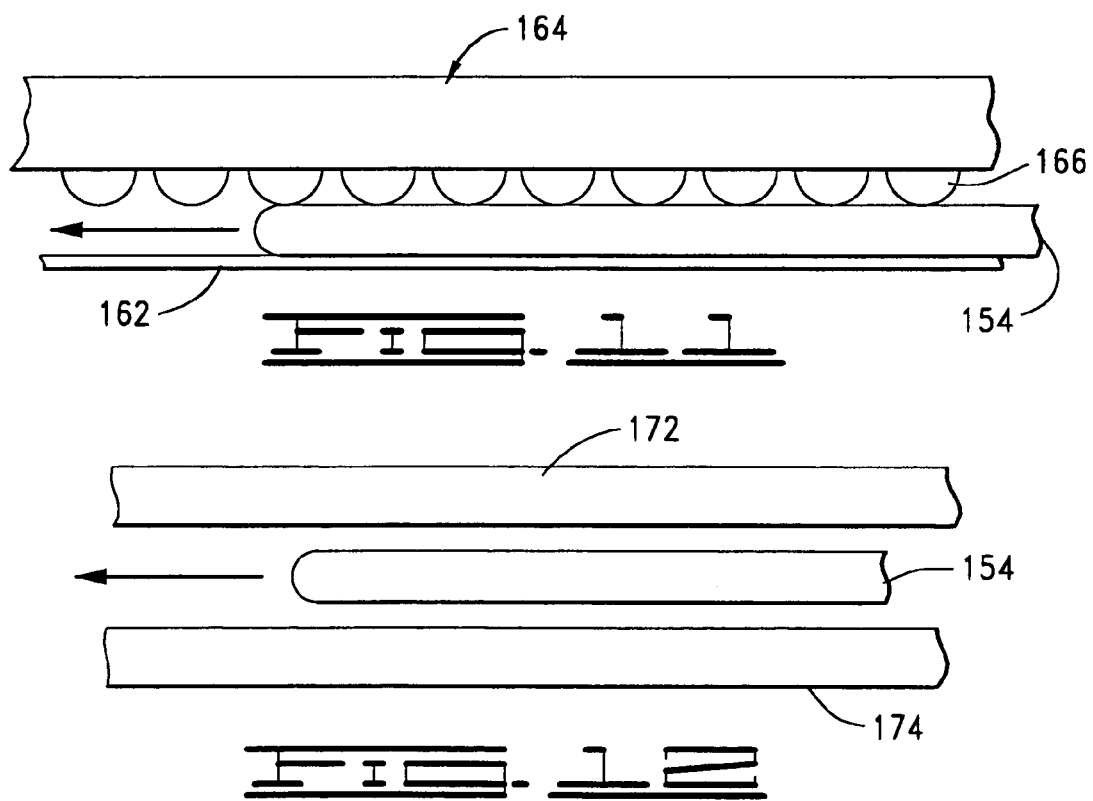
FIG. 12 provides a schematic representation of guide rails used by the transport and marking system to support an upper portion of the substrate.

A pair of guiding rails 172, 174 (shown in FIGS. 1 and 12) allow the substrate to pass along the length of the transport 104 and serve to support the upper portion of the substrate so that the substrate remains in a nominally vertical orientation. An inkjet printer head 176 encodes the inboard surface of the substrate with the desired information as the substrate 154 moves thereacross.

Figure 13:
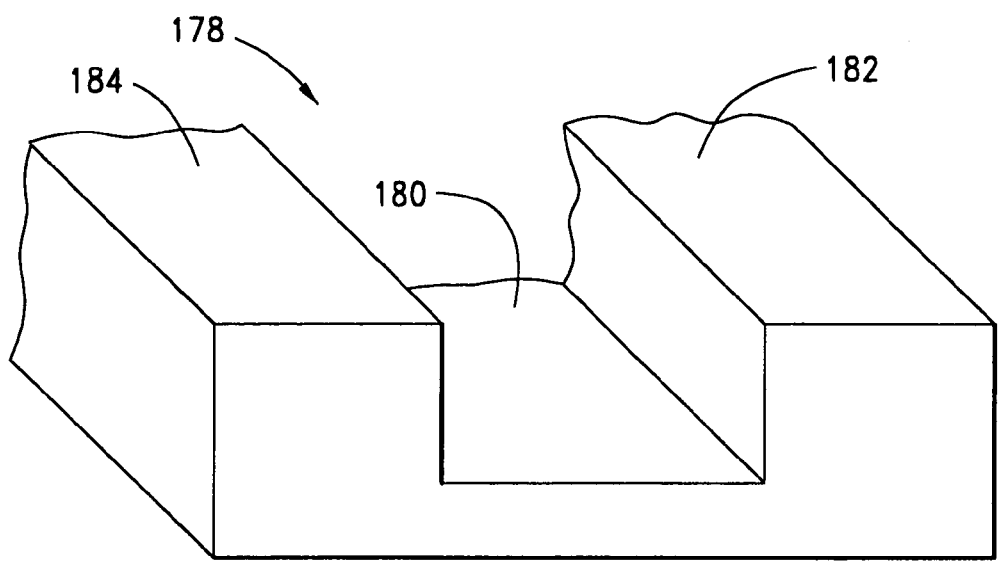
FIG. 13 illustrates a portion of a channel used to slidingly support a bottom edge of the substrate through the transport and marking station.
Figure 14:
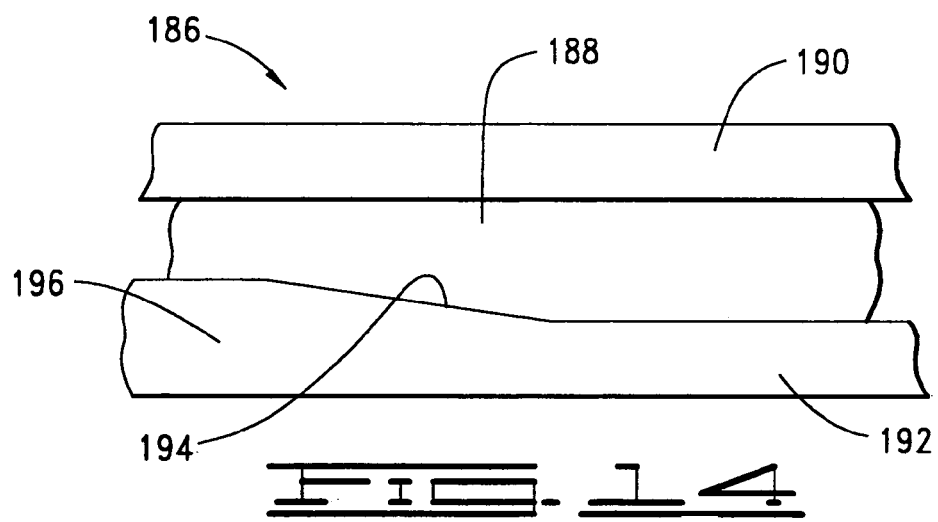
FIG. 14 illustrates a portion of a channel used to slidingly support the bottom edge of the substrate through the gravity discharge station.

The bottom edge of the substrate 154 is supported along the length of the transport 104 by a channel 178, as shown in FIG. 13. The channel 178 preferably comprises a deck surface 180 and retaining sidewalls 182, 184, all of which being formed of a durable, low friction material. Preferably, the channel 178 has a width of about 1-½ inches to accommodate a wide variety of different types of substrates, although other dimensions can be selected as desired depending upon the media utilized.

The drive system 160 preferably extends along the lower portion of the substrate, and the guiding rails 172, 174 align along the top portion of the substrate, allowing the inkjet printer 176 to be positioned as desired to mark substantially any portion or portions of the substrate. As mentioned previously, it will be readily apparent that multiple printers and/or other marking assemblies such as labeling, adhesive, painting, imprinting mechanisms etc. can be mounted to the transport 104 to mark the substrates. Moreover, while the system 100 as shown performs marking on only one side (the inboard surface) of the substrates, it will be readily apparent that the system 100 can be modified to provide outboard or dual side marking as desired.

The drive system 160 drives each substrate 154 in turn into the stacker 106, and continues to do so until a trailing edge of the substrate exits the drive system 160. No separate mechanized driving or actuation system is preferably included in the stacker, as such is unnecessary as will now be explained.

The stacker 106 preferably includes a channel 186 with deck surface 188 and sidewalls 190, 192 that nominally align with and are similarly oriented as the deck surface 180 and sidewalls 182, 184 of the transport. The channel 186 further includes a diverting sidewall 194 which extends inboard as shown in FIG. 13 to a second sidewall 196. This effects a narrowing of the channel 186 which displaces the bottom edge of the substrate 154 toward the inboard direction (y-axis) as the substrate is driven into the stacker 106 (by transport 104).

Figure 15:
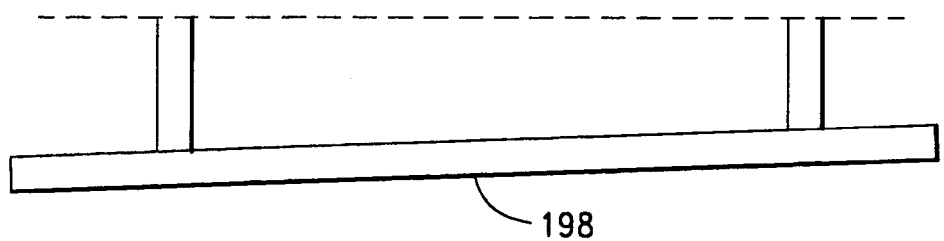
FIG. 15 generally illustrates a guide rail of the gravity discharge station, the guide rail and channel of FIG. 14 cooperating to induce a tilt in the substrate.
Figure 16:
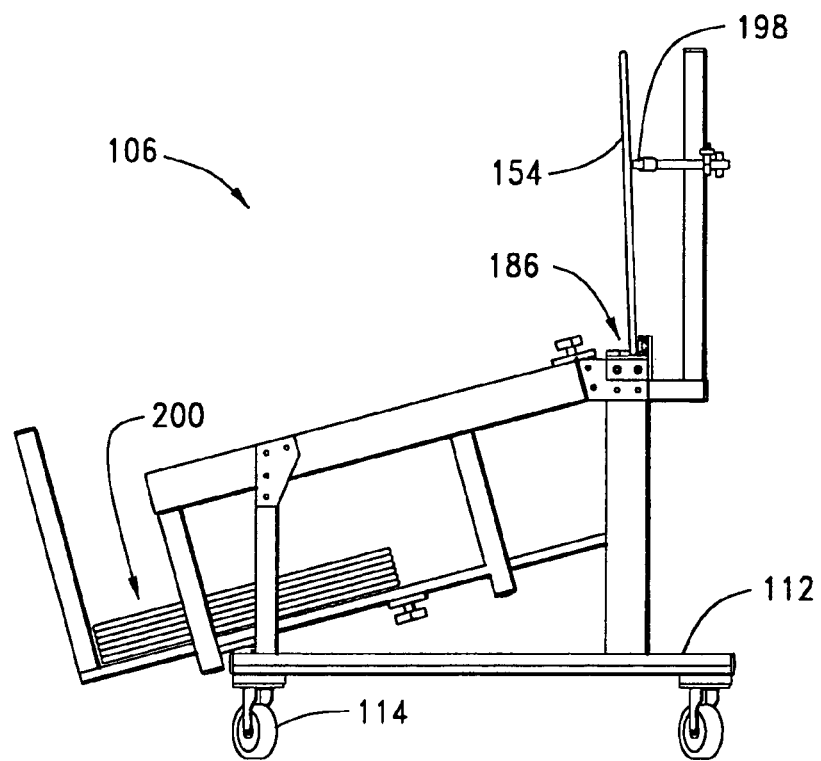
FIGS. 16 and 17 provide side elevational views of the gravity discharge station to generally illustrate the manner in which substrates are stacked in a controlled fashion using gravity.
Figure 17:
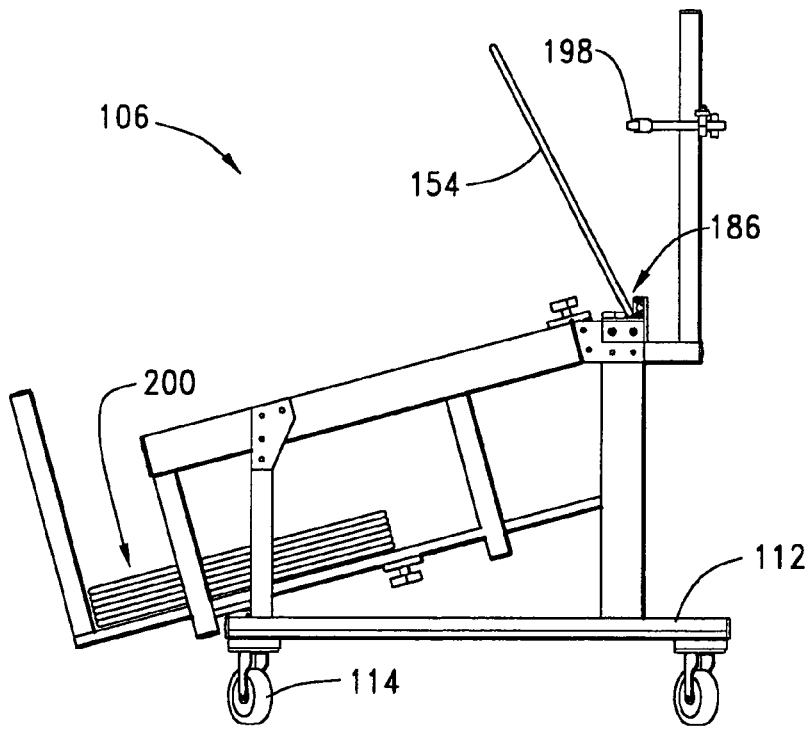

At the same time, guide rail 198 is skewed outboard at a slight angle, as shown in FIG. 15. An upper portion of the inner surface of the substrate 154 contactingly slides along the guide rail 198 Thus, the lower portion of the substrate is displaced outwardly (outboard), inducing a tilt in the substrate 154 as the substrate is successively advanced into the stacker 106, as illustrated by FIGS. 16 and 17. The elevation and skew of the guide rail 198 are preferably adjusted such that, just after the transport 104 completes the driving of the substrate 154 into the stacker 106, the substrate initiates a slow, gentle tumble (induced by gravity) into a completed stack 200.

The various embodiments of the system 100 as described herein provide various advantages over the prior art. The feeder station allows repeatable, reliable and high speed feeding of the substrates into the transport while requiring little user intervention to maintain the feedstock in the feeder. This allows high-throughput operations, limited essentially only by the linear velocity of the transport 104. Another advantage is the simplicity of the stacker; by inducing a tilt in the exiting substrates, the substrates can be easily and effortlessly stacked without the need for complex actuators or other mechanisms. This further cuts down on user interventions and simplifies processing.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

In addition, although the embodiments described herein are generally directed to providing a system for processing collapsed cardboard cartons, it will be appreciated by those skilled in the art that the embodiments disclosed herein can be used to process other types of substrates, such as the printing of foamboard, posterboard or other types of media without departing from the spirit and scope of the claimed invention.

What is claimed is:
1. An apparatus, comprising:
a feeder station configured to receive a substantially vertically aligned stack of substrates having an innermost substrate and an outermost substrate, each substrate within said stack comprising opposing top and bottom edge surfaces and opposing inboard and outboard planar surfaces, the feeder station comprising an advancement assembly which supports and advances the respective bottom edge surfaces of the substrates in the stack along a first direction, a tensioner assembly which applies a clamping force to support and urge the stack along the first direction, and a transfer assembly which engages the inboard planar surface of the innermost substrate in the stack, rotates a bottom portion of the innermost substrate while a top portion of the innermost substrate remains clamped by the tensioner assembly, retracts the innermost substrate from the stack to remove said clamping by the tensioner assembly, and then advances the retracted innermost substrate adjacent the stack;
a transport and marking station coupled to the feeder station and comprising a drive system which moves said substrate at a selected linear velocity, and a marking mechanism which applies a selected marking to the innermost substrate, wherein the transfer assembly further advances the substrate for engagement by the drive system; and
a gravity discharge station coupled to the transport and marking station, comprising a stationary channel along which a bottom edge of said substrate contactingly as said substrate continues to be advanced by the drive system of the transport and marking station, said channel narrowing to displace the bottom edge in an inboard direction, the station further comprising a stationary guide rail skewed with respect to a direction of travel of the substrate induced by the drive system so that the upper portion is displaced in an outboard direction opposite the inboard direction as the upper portion contactingly slides along the stationary guide rail, wherein the channel and guide rail cooperatively induce a tilt in the substrate sufficient to cause the substrate to controllably rotate and fall downwardly due to gravity into a completed stack after a trailing edge of said substrate exits the drive system.

2. The apparatus of claim 1, wherein the tensioner assembly comprises an inboard stationary retainer bar and an outboard moveable retainer bar which cooperate to apply the clamping force to the stack, wherein the transfer assembly rotates the innermost substrate while the substrate remains in contacting engagement with the inboard stationary bar, and wherein the transfer assembly subsequently retracts the substrate to remove the innermost substrate from said contacting engagement with the inboard stationary retainer bar.

3. The apparatus of claim 1, wherein the substrates each comprise a collapsed corrugated cardboard carton.

4. The apparatus of claim 1, wherein the channel comprises a stationary base surface along which the substrate contactingly slides and opposing sidewalls that form a first width of the channel, the channel further comprising a diverting sidewall which extends in the inboard direction to form a second, narrower width of the channel.

5. The apparatus of claim 1, wherein the gravity discharge station further comprises a frame to which the stationary guide rail is adjustably fixed to maintain the stationary guide rail at a preselected elevation and skew with respect to the channel.

6. The apparatus of claim 1, wherein the channel and the station ay guide rail each remain in a fixed, non-movable orientation as the substrate is passed through the gravity discharge station.

7. An apparatus, comprising:
   first means for transporting an innermost substrate from a stack of said substrates while maintaining the innermost substrate in a substantially vertical orientation; and
   a gravity discharge station comprising a narrowing stationary channel along which a bottom edge of the substrate contactingly slides to displace the bottom edge in an inboard direction, the station further comprising a stationary, skewed guide rail along which an upper portion of the substrate contactingly slides to displace the upper portion in an outboard direction opposite the inboard direction, wherein the channel and the guard rail cooperatively induce a tilt in the substrate sufficient to cause the substrate to controllably rotate and fall downwardly due to gravity into a completed stack.

8. The apparatus of claim 7, wherein the first means comprises a feeder station configured to receive said stack of substrates, each substrate within said stack comprising opposing top and bottom edge surfaces and opposing inboard and outboard planar surfaces, the feeder station comprising:
   an advancement assembly which supports and advances the respective bottom edge surfaces of the substrates in the stack along a first direction;
   a tensioner assembly comprising an inboard stationary retainer bar and an outboard moveable retainer bar which cooperate to apply a clamping force to support and urge the stack along the first direction, the advancement assembly and the tensioner assembly cooperating to incline the substrates in said stack at a relatively small angle with respect to a vertical direction; and
   a transfer assembly which engages the inboard planar surface of the innermost substrate in the stack, rotates a bottom portion of the innermost substrate while a top portion of the innermost substrate remains clamped by the tensioner assembly, retracts the innermost substrate from the stack to remove said clamping by the tensioner assembly, and then advances the retracted innermost substrate adjacent the stack.

9. The apparatus of claim 8, wherein the transfer assembly rotates the innermost substrate while the substrate remains in contacting engagement with the inboard stationary bar, and wherein the transfer assembly subsequently retracts the substrate to remove the innermost substrate from said contacting engagement with the inboard stationary retainer bar.

10. The apparatus of claim 7, wherein the first means comprises a transport and marking station comprising a drive system which moves the substrate at a selected linear velocity, and a marking mechanism which applies a selected marking to the substrate.

11. The apparatus of claim 7, wherein the substrates each comprise a collapsed corrugated cardboard carton.

12. The apparatus of claim 7, wherein the channel comprises a stationary base surface along which the substrate contactingly slides and opposing sidewalls that form a first width of the channel, the channel further comprising a diverting sidewall which extends in the inboard direction to form a second, narrower width of the channel.

13. The apparatus of claim 7, wherein the gravity discharge station further comprises a frame to which the stationary guide rail is adjustably fixed to maintain the stationary guide rail at a preselected elevation and skew with respect to the channel.

14. The apparatus of claim 7, wherein the channel and the stationary guide rail each remain in a fixed, non-movable orientation as the substrate is passed rough the gravity discharge station.

* * * * *